(12) United States Patent
Lundy et al.

(10) Patent No.: US 7,693,534 B1
(45) Date of Patent: Apr. 6, 2010

(54) METHOD AND APPARATUS FOR DYNAMIC SELECTION OF COMPLETE OR REFERENCED GROUP INDICATION WHEN INITIATING A GROUP COMMUNICATION SESSION

(75) Inventors: Michael T. Lundy, Olathe, KS (US); Harry Lai, Overland Park, KS (US); Dan Durig, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 766 days.

(21) Appl. No.: 11/634,595

(22) Filed: Dec. 5, 2006

(51) Int. Cl.
*H04B 7/00* (2006.01)
(52) U.S. Cl. ........................ 455/518; 455/459
(58) Field of Classification Search .................. 455/466, 455/432.3, 514, 407, 414.1, 416
See application file for complete search history.

(56) References Cited

U.S. PATENT DOCUMENTS

2005/0192041 A1   9/2005   Oxley et al.
2006/0009249 A1   1/2006   Fu et al.
2006/0111135 A1   5/2006   Gray et al.

*Primary Examiner*—Tu X Nguyen

(57) ABSTRACT

A method and apparatus are disclosed for dynamically selecting a complete or referenced group indication when initiating a group communication session in a communication system. A client device may include logic through which the device will decide, at the time of group session initiation, whether to initiate the session by reference to a complete group listing or rather whether to initiate the session by reference to a group identifier (e.g., group-ID). The client device may be capable of maintaining group data in order to indicate whether the client device and a communication server have agreed on a group-ID to correspond with a particular group. When a user directs the client device to initiate a session with a particular group, the client device will initiate the session by reference to the group-ID if the client device and communication server have agreed on a group-ID to correspond to the particular group. On the other hand, if not, the client device will initiate the session by reference to the complete group listing for the particular group.

24 Claims, 4 Drawing Sheets

METHOD AND APPARATUS FOR DYNAMIC SELECTION OF COMPLETE OR REFERENCED GROUP INDICATION WHEN INITIATING A GROUP COMMUNICATION SESSION

FIELD OF THE INVENTION

The present invention relates to network communications and, more particularly, to management of group lists for use in establishing network-based group communications.

DESCRIPTION OF RELATED ART

In typical practice, when a client device initiates a group communication session, the client device sends to a communication server a session initiation request (e.g., SIP, H.323, or the like) that provides the server with some indication of the group (of one or more other parties) with which the session is to be initiated. The server then sets up session legs with each indicated group member and bridges the legs together so as to allow the parties to communicate with each other.

The group indication that the initiating device provides to the communication server in the session initiation request can take various forms. In one arrangement, for instance, the group indication can be a complete listing of the group members. Upon receipt of the session initiation request, the server may then read the list from the request and work to set up session legs with each listed group member. In another arrangement, however, the group indication can be a more simple identifier of the group, such as a group-ID that the client device and server have established in advance to represent a particular listing of group members. In that case, upon receipt of the session initiation request, the server may read the group-ID from the request and may then refer to network-based group-data to determine the group members represented by the group-ID. The server may then work to set up session legs with each identified group member.

In general, a client device and communication server can synchronize or agree upon a correlation between a group-ID and a list of group members in various ways, whether the group-ID is assigned by the client device and reported to the server, or whether the group-ID is assigned by the server and reported to the client device.

SUMMARY

The present invention provides a method and mechanism for dynamically selecting whether to initiate a group communication session with a complete or referenced group indication.

According to the present invention, a client device may include logic through which the client device will decide, at the time of group-session initiation, whether to initiate the session by reference to a complete group listing (i.e., by providing the server with the complete group listing) or rather whether to initiate the session by reference to a group-ID (i.e., by providing the server with the group-ID). When a user directs the client device to initiate a session with a particular group, the client device may determine whether the client device and communication server have agreed on a group-ID to correspond with a particular group. If so, the client device may initiate the session by reference to the group-ID. On the other hand, if not, the client device may initiate the session by reference to the complete group listing. In one embodiment of the invention, the client device is a cell phone with push-to-X capabilities.

In an exemplary embodiment of the invention, the client device may maintain group data in data storage. The group data may define one or more group listings and, for each group listing, a corresponding group-ID. Further, the group data may indicate, to the best of the client device's knowledge, the synchronization state between the client device and the communication server for each listing. In addition, the client device may be capable of engaging in a synchronization process with the communication server in order to update the synchronization state for each listing.

In the exemplary embodiment, when a group listing is changed, the client device may set the client-server synchronization state as either up to date or not. After engaging in a synchronization process with the communication server, the client device may set the client-server synchronization state as up to date.

The synchronization process may involve the client device sending the communication server both a group-ID and a group listing for a specified group. The communication server may then send the device a synchronization acknowledgement after receiving both the group-ID and the group listing for a specified group. Upon receiving such an acknowledgement, the synchronization process is complete and the client device may set the client-server synchronization state as up to date.

Alternatively, synchronization may involve the communication server sending the client device a group-ID and a group listing for a specified group. The device may then determine whether the specified group is already defined as an existing group. If the group data already defined the received group listing as an existing group, then the client device may update the group data to specify for the existing group the received group-ID. However, if the group data did not already define the received group listing as an existing group, then the client device may update the group data to specify the given group by both the received group listing and the received group-ID. Other examples of synchronization are possible as well.

The client device may receive a group listing designated by the user of the device. In response, the device may then determine whether the designated listing is already defined by the group data. If the device determines that the listing is not already defined by the group data, then the device may add the listing to the group data and also set the client-server synchronization state for that group listing as not up to date.

Alternatively, the user could modify a group listing already in the client device's group data. In that case, the device could responsively modify the listing in the group data and set the client-server synchronization state for that group listing as not up to date. In turn, the device could set the synchronization state of the group listing as up to date after engaging in a synchronization process with the communication server.

Preferably, the determination by the client device of whether to initiate a session with group-ID or a group listing is transparent to the user. From the user's perspective, all that would matter is that the user would direct the client device to initiate a session with a group specified by the user. If the client device determines that the synchronization state of the group is up to date, then the client device can most efficiently initiate the session by reference to the group-ID, thus avoiding the need to send the complete group listing in the session initiation request, thereby conserving network resources. On the other hand, if the client device determines that the synchronization state of the group is not up to date, the client device can send the complete group listing so as to provide the server with the proper group listing for the session.

These as well as other features, advantages and alternatives will become apparent to those of ordinary skill in the art by

DETAILED DESCRIPTION

1. Overview

As indicated above, the present invention provides a method and system for deciding, at the time of group-session initiation, whether to initiate the session by reference to a complete group listing or by reference to a group-ID. In a preferred embodiment, a client device will maintain group data that defines one or more group listings and corresponding group-IDs. Further, the client device will maintain the group data such that the group data indicates, to the best of the client device's knowledge, the synchronization state for each group listing. If the client device and a communication server have agreed on a group-ID to correspond to a particular group, the client device will mark the synchronization state as up to date. If the synchronization between the client device and communication server is up to date for a particular group, the client device will initiate the session by reference to the group-ID. However, if the synchronization state is not up to date, the client device will initiate the session by reference to the complete group listing.

2. Exemplary Communication System Architecture

Figure 1:
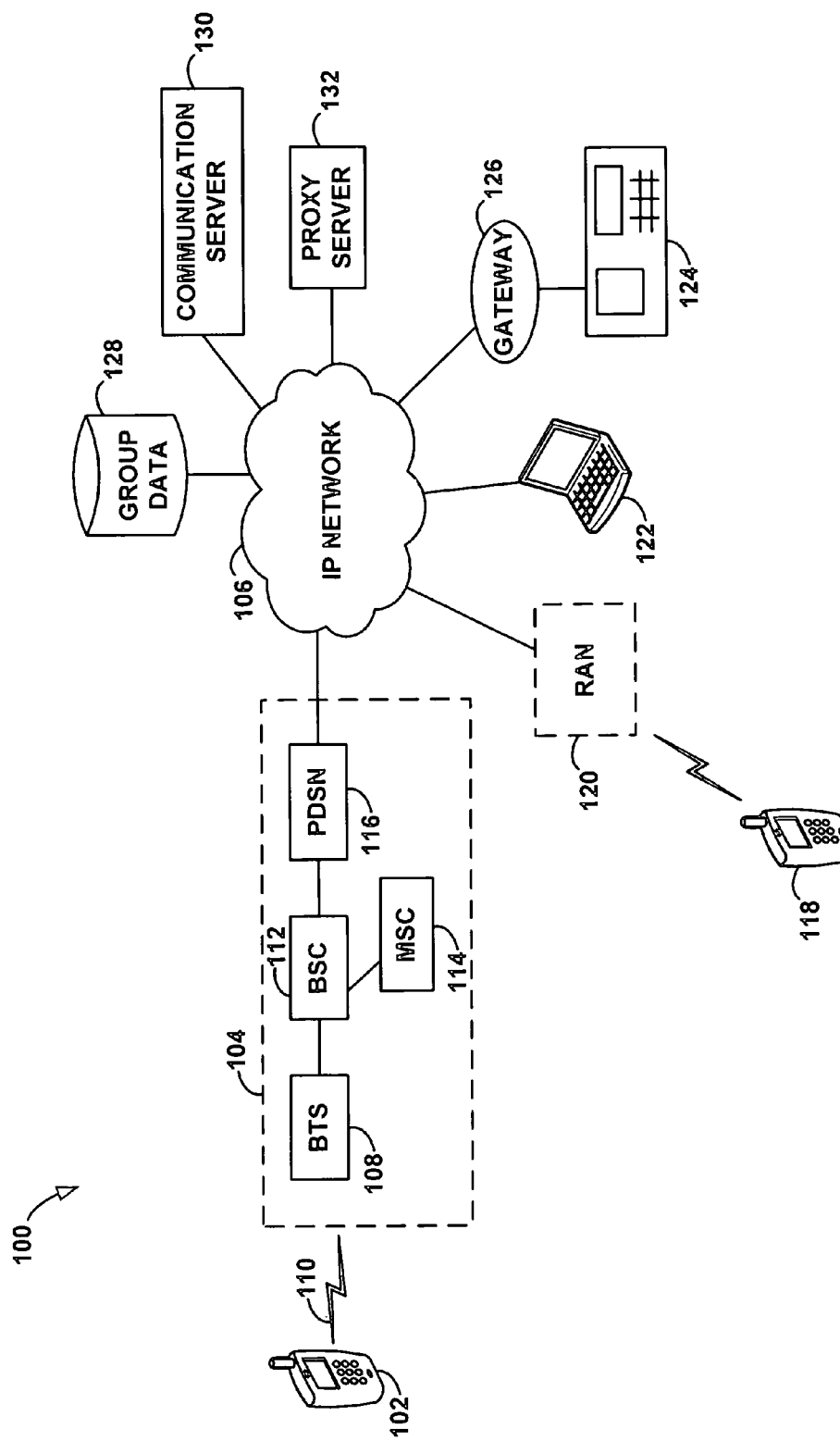
FIG. 1 is a block diagram of a communication system in which the exemplary embodiment of the invention can be employed.

The arrangement shown in FIG. 1 illustrates a communication system 100 in which the exemplary embodiment of the present invention can be employed. Note that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and as a combination of hardware, firmware, and/or software.

System 100 includes a client device 102 (e.g., a mobile station) that can be linked by a radio access network 104 with a packet-switched network such as IP network 106. Radio access network 104 provides wireless connectivity with IP network 106 and can take a variety of forms. By way of example, radio access network 104 may include a base transceiver station (BTS) 108 that can communicate with client device 102 over an air interface 110. BTS 108 may then be coupled with a base station controller (BSC) 112, which may in turn be coupled with a mobile switching center (MSC) 114 and with a packet data serving node (PDSN) 116 or other gateway to IP network 106.

In order for client device 102 to be able to engage in packet-data communication over IP network 106, the mobile station may need to acquire a radio link layer connection over air interface 110 and a data layer link connection with PDSN 116 or another gateway to IP network 106. The process of acquiring these links can take various forms depending on the protocols used for communication. For instance, each air interface may be a code division multiple access (CDMA) air interface, and communications between each mobile station and the radio access network may comply with an industry standard such as cdma2000, which is published by the $3^{rd}$ Generation Partnership Project 2. However, the air interface could follow other protocols as well, such as EV-DO, TDMA, GSM, or 802.11x for instance.

Under cdma2000, to establish a packet-data connection, a mobile station would send a packet-data origination request over a common air interface channel (such as a reverse link access channel) to the MSC and would include in the request a "packet data" service option code that indicates a desire to establish a packet-data connection. In response to the "packet data" service option code, the MSC may then send the request to the BSC for processing.

In turn, the BSC may then establish a radio link layer connection with the mobile station, by directing the mobile station to operate on a particular traffic channel over the air interface (e.g., a fundamental traffic channel, and perhaps one or more supplemental channels). In addition, the BSC may pass the initiation request to the PDSN, and the PDSN and mobile station may then negotiate with each other to establish a data-link layer connection, typically a point-to-point protocol (PPP) session, over which packet data can be communicated between the mobile station and the PDSN. Further, the PDSN sends a foreign agent challenge message to the mobile station, and the mobile station responds with a mobile-IP registration request (MIP RRQ), which the PDSN forwards to a mobile-IP home agent (HA). The HA then assigns an IP address for the mobile station to use, and the PDSN passes that IP address via the BSC to the mobile station. The mobile station can use the IP address as its network address for communicating with other entities on the packet-switched network.

Alternatively, client device 102 may establish a packet-data connection under EV-DO, which is defined by industry standard IS-856. Under IS-856, after a mobile station first detects an IS-856 carrier frequency, the mobile station sends to its BSC a Universal Access Terminal Identifier (UATI) request, and receives in response a UATI assignment. Upon assignment of the UATI the mobile station then submits a connection request to acquire a MAC ID (e.g., an International Mobile Station Identifier (IMSI)), which the BSC can then use to address the mobile station in subsequent communications. In addition to the MAC ID assignment response from the connection request, the BSC responsively invokes a process to authenticate the mobile station and to have the mobile station acquire a data link.

In particular, the BSC sends an access request to an Access Network AAA (ANAAA) server, and the ANAAA server authenticates the mobile station. The BSC then assigns radio resources for the data session, by directing the mobile station to operate on a particular time slot traffic channel on the forward link and a particular Walsh coded traffic channel on the reverse link. Further, the BSC signals to the PDSN, and the PDSN and mobile station then negotiate to establish a PPP data link. In addition, as in the cdma2000 process, the mobile station then sends an MIP RRQ to the PDSN, which the PDSN forwards to a HA, and the HA assigns a mobile-IP address for the mobile station to use.

Returning to the exemplary communication system architecture, a plurality of entities are connected with or are sitting as nodes on the IP network 106, as depicted in FIG. 1. It should be understood that each of these entities represents a function within the exemplary network. As such, the entities could take various forms and could be combined together or distributed in various ways (e.g., made up of a number of components) as desired. Further, some of the entities could be omitted, and others could be added.

Any of these or other entities that are described herein as carrying out a particular function could include a processor and data storage holding an appropriate set of program instructions (e.g., machine language instructions) executable by the processor to carry out that function. Alternatively or additionally, such entities could include hardware and/or firmware for carrying out various functions as described. Still further, it should be understood that some or all of the entities shown on the network 106 could instead be on discrete networks or arranged in other locations.

IP network 106 may be connected to other mobile stations, such as mobile station 118. This mobile station 118 may be connected to IP network 106 via a RAN, such as RAN 120. Alternatively, mobile station 118 could be connected via RAN 104. Further, a computer, such as computer 122, may be connected to IP network 106. Additionally, IP network 106 may be connected to landline telephones, such as telephone 124 via a gateway 126 for instance. Further, group data 128 may be connected to IP Network 106. In addition, an AAA server (not shown) and a mobile-IP HA (not shown) may also be sitting as nodes on IP network 106.

3. Conference Setup and Initiation in the Exemplary Communication Architecture

Another entity shown sitting on IP network 106 is a communication server 130. In the exemplary communication architecture, it is possible to establish a conference session between multiple user stations connected to IP Network 106. The communication server allows users to establish real-time media conferences over IP network 106 with multiple user stations, each operated by a respective user. For example, communication server 130 may allow a conference session to be established between client device 102, mobile station 118, and landline telephone 124. Communication server 130 can reside functionally in the IP network and can operate as a bridging or switching device between the participating user stations in order to support a conference session.

In practice, a participating user station might initiate a conference session by sending to communication server 130 a session setup message that identifies the other desired participant(s). The communication server may then seek to connect each of the designated other participants, such as by forwarding the session setup message or sending a new session setup message to each other party. Ultimately, communication server 130 would thereby establish a conference leg with each participating user station, including the initiating station, and the communication server would then bridge together the legs so that the users at the stations can confer with each other, exchanging voice, video, and/or other media in real time via the server.

A signaling mechanism such as the well known Session Initiation Protocol (SIP) could be used to initialize the conference and more particularly to set up each conference leg. Further, digitized media could be packetized and carried between each participating station according to a mechanism such as the well-known Real-time Transport Protocol (RTP), for instance. The core industry standards for SIP (Internet Engineering Task Force (IETF) Request For Comments (RFC) 2543 and RFC 3261) and RTP (IETF RFC 1889) are both hereby incorporated by reference.

Communication server 130 is equipped with hardware and logic (e.g., a processor, data storage, and machine language instructions stored in data storage) to be able to set up media communications with each station and to bridge those communications together so as to allow users at the stations to communicate with each other. As such, communication server 130 may be programmed to engage in signaling communications according to SIP or another designated protocol, in order to set up a conference leg with each participating station. And communication server 130 may further be programmed to receive and send media streams according to RTP or another designated protocol.

Communication server 130 can comprise a number of components, such as (i) a SIP user agent application to set up communication sessions, (ii) an RTP application to facilitate sending and receiving of real-time media, and (iii) bridging logic to bridge together sessions between multiple users so that the users can communicate with each other. Other arrangements are possible as well. As one example, communication server 130 can be a multipoint conference unit (MCU).

In the exemplary embodiment, communication server 130 may use packet based media conferencing to provide an "instant connect" service, where a user of one mobile station can readily initiate a real-time media conference with one or more designated target users at other stations. The initiating user may simply select a target user or group and then press an instant connect button on his or her station, and the user's station would responsively signal to the communication server and cause the server to initiate a conference between the initiating user and the selected user or group. This sort of service is referred to a "instant connect" because it strives to provide a quick connection between two or more users, in contrast to telephone service where a user dials a telephone number of a party and waits for a circuit connection to be established with that party.

An example of an instant connect service is commonly known as "push-to-talk" (PTT). In a PTT system, some or all of the stations of a conference session are likely to be wireless devices such as cellular mobile stations, which are equipped to establish wireless packet-data connectivity and to engage in voice-over-packet (VoP) communication. Alternatively, some or all of the stations could be other sorts of devices, such as multimedia personal computers or Ethernet-telephones, that can establish packet-data connectivity and engage in VoP communication through landline connections. Further, each station could be equipped with a PTT button or other mechanism that a user can engage in order to initiate a PTT session or to request the floor during an ongoing session.

In practice, a user of a PTT-equipped mobile station might select a target user or group of users from a contact list or other program menu and engage the PTT button to initiate a conference session with that user or group. In response, the mobile station may then send a session initiation message to the communication server, to set up a conference session in the manner described above for instance, and the user could begin talking with the other users. Further, as a general matter, this sort of instant connect service could be applied to establish real-time media conferences carrying any kind of media (e.g., audio, video, etc.). This type of instant connect service is generally referred to a push-to-X (PTX).

As a more particular example, a user of client device 102 may instruct the client device to initiate a conference, and the device may responsively execute SIP user agent logic to generate and send a SIP INVITE message to communication server 130, seeking to invite other members of a group (of one or more other parties) to a communication session. Conventionally, the SIP INVITE may carry a session description protocol (SDP) block that indicates the mobile station's capabilities and the desired session type. The SIP INVITE message may provide the communication server 130 with some indication of the group (one or more parties) with which the session is to be initiated.

This group indication that the initiating client device 102 provides to the communication server 130 in the session initiation request can take various forms. In one arrangement, for instance, the group indication can be a complete listing of the group members. In another arrangement, however, the group indication can be a more simple identifier of the group, such as a group-ID that the client device 102 and server 130 have established in advance to represent a particular listing of group members.

The communication server 130 may then treat the INVITE message as a request to establish a session between client device 102 and the other members of the specified group. And to establish that session, the communication server 130 may send another INVITE to the members of the specified group seeking to set up a session with those users, and including an SDP block that indicates the communication server's capabilities and the desired session type. Communication server 130 may contact a proxy server 132 to forward or direct signaling messages from point to point through the network. For instance, if SIP signaling is used, the proxy server 132 could be a SIP proxy server.

Upon receipt of the INVITE from the communication server 130, the devices of the members of the specified group may execute SIP user agent logic to accept the invitation, by sending a SIP 200 OK message back to the communication server 130 (providing an SDP block that indicates the device's capabilities). Upon receipt of the 200 OK, the communication server 130 may then send a 200 OK to the client device 102 (including an SDP block that indicates the communication server's capabilities). In turn, the client device 102 may send a SIP ACK (acknowledgment) to the communication server 130, and the communication server 130 would send an ACK to the devices of the members of the specified group. As a result, two or more communication sessions or legs will have been initiated, one between the client device 102 and the communication server 130, and another one respectively between the communication server 130 and each other participating member's device. Once these legs have been established, the devices may begin communicating with the communication server 130 via the respective legs. The communication server 130 may bridge together the legs, thereby allowing the users of the devices to communicate with each other.

4. Exemplary Mobile Station Components

Figure 2:
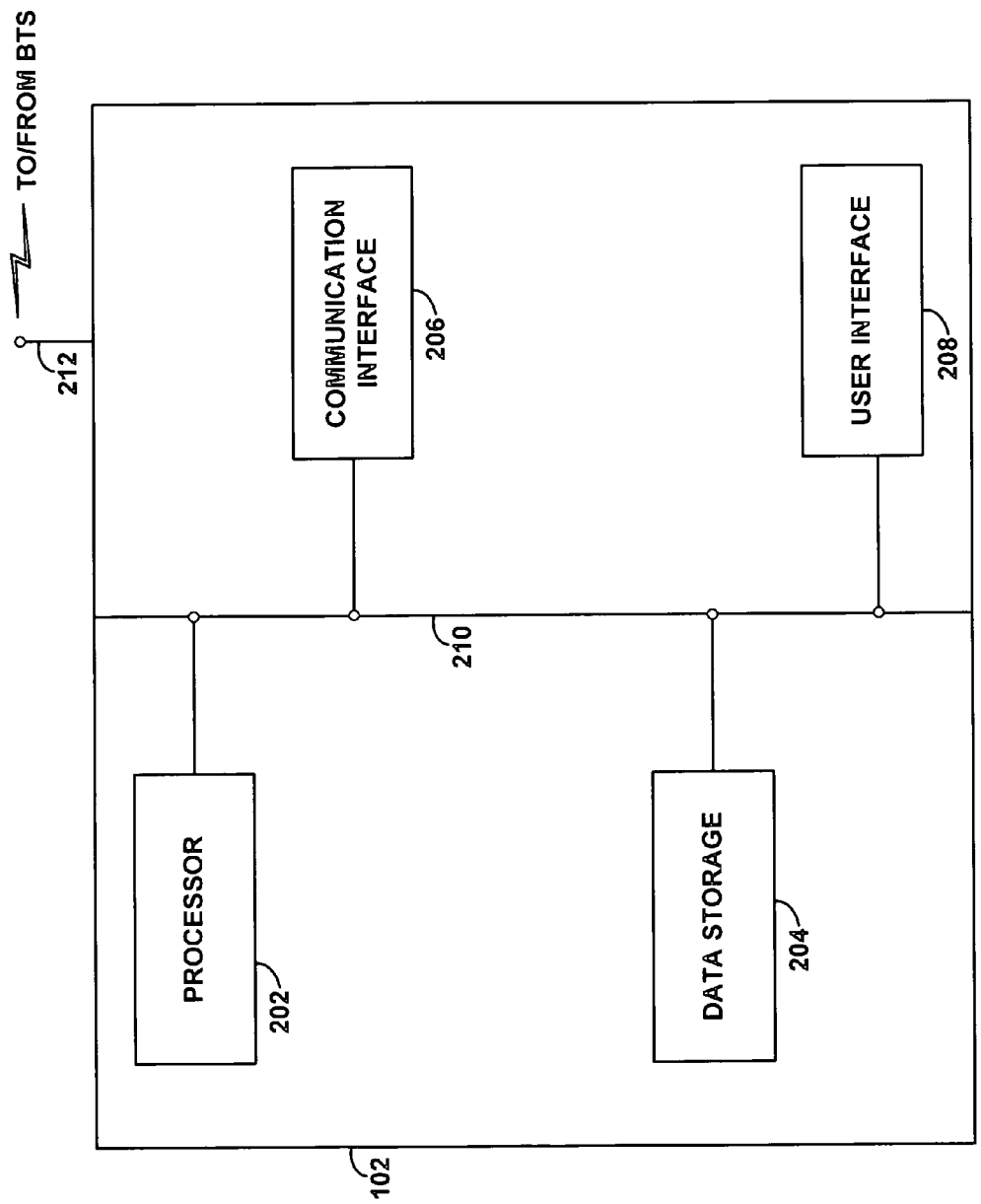
FIG. 2 is a block diagram of an exemplary client device that can be used in the arrangement of FIG. 1.

A block diagram of an exemplary client device 102 is provided in FIG. 2, in order to illustrate some of the components that could be included in such a device to carry out the exemplary embodiment of the invention. As shown in FIG. 2, the client device 102 may include a processor 202, data storage 204, a wireless communication interface 206, and a user interface 208, all of which may be coupled together by a system bus or other mechanism 210. Each of these components may take various forms.

For instance, processor 202 could be one or more general purpose microprocessors and/or dedicated signal processors. Data storage 204 could be volatile and or nonvolatile memory, such as flash memory or a storage drive. Wireless communication interface 206 could comprise a chipset (not shown) compliant with a desired air interface protocol such as CDMA, EV-DO, TDMA, GSM, or 802.11x for instance. Further, the wireless communication interface may include an antenna 212 for sending and receiving signals over air interface 110.

User interface 208, in turn, may facilitate interaction with a user, to receive voice from a user and play out voice to a user, and to receive user instructions to initiate or conclude a session. By way of example, the user interface may include a microphone (not shown) for receiving analog speech signals from a user and a speaker (not shown) for playing out analog speech signals to a user. Further, user interface may include analog-to-digital conversion circuitry (not shown) for converting between analog voice signals and digital voice signals. And still further, the user interface may include a TALK button (e.g., a PTT button), which the user can engage in order to initiate a session or request the floor during an ongoing session.

In the exemplary embodiment, data storage 204 holds a set of logic (e.g., computer instructions) executable by processor 202 to carry out various functions described herein. Alternatively, the logic may be embodied in firmware and/or hardware. For example, in response to user actuation of the TALK button, if the mobile station does not currently have a radio link layer connection and a data link layer connection, the logic may cause the processor to send an origination request into a radio access network 104 to acquire the necessary connection(s). Further, data storage 204 may hold group data.

5. Exemplary Operation

Figure 3:
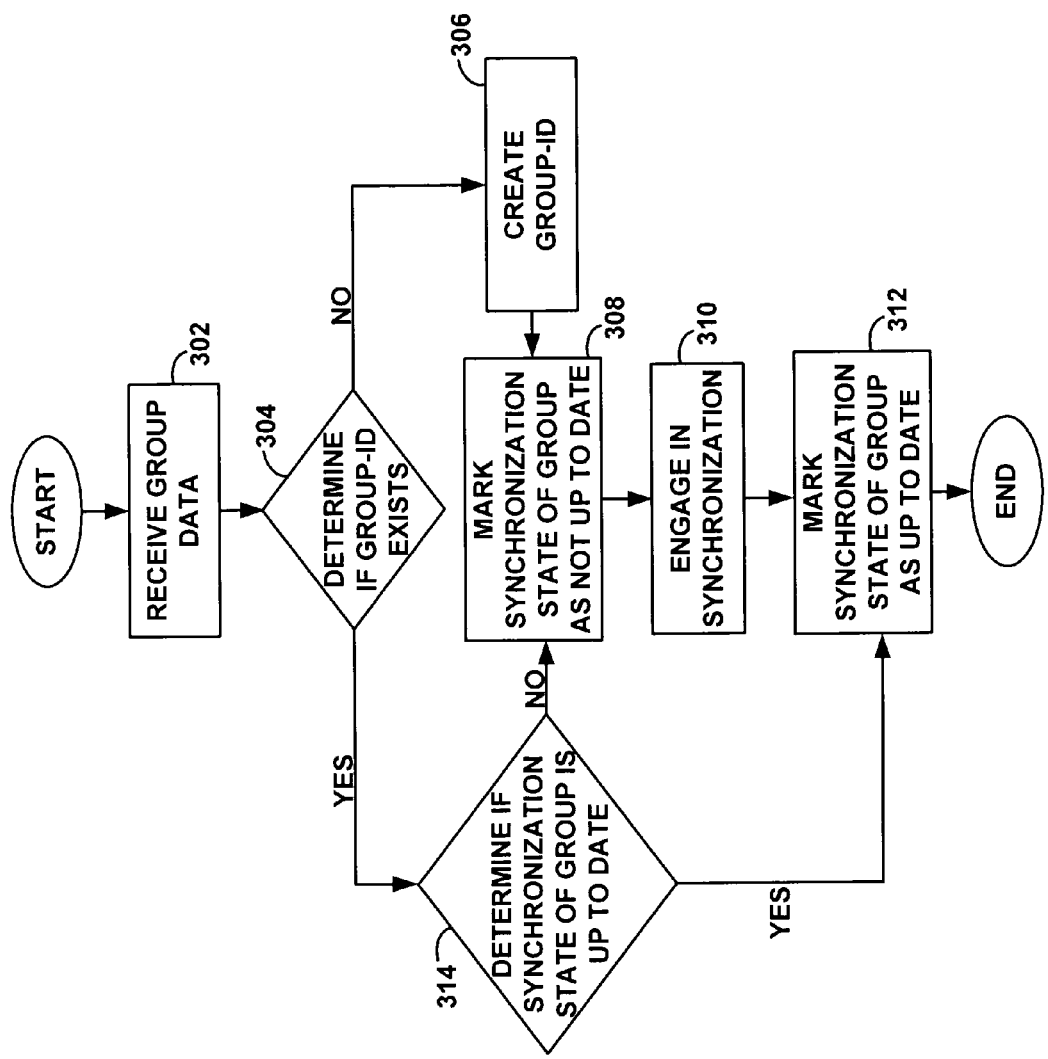
FIG. 3 is a flow chart depicting group data maintenance functions that can be carried out in accordance with the exemplary embodiment of the invention.
Figure 4:
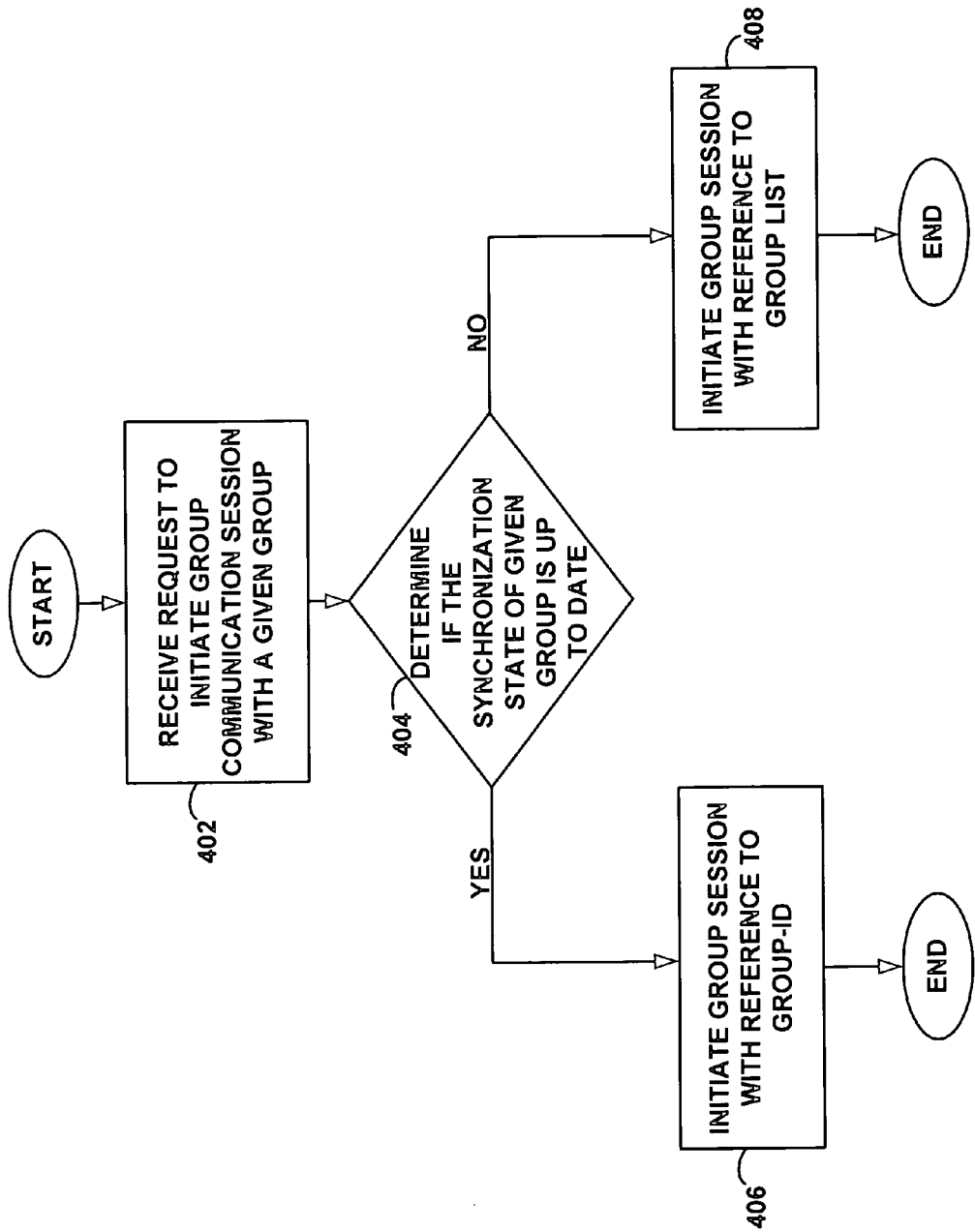
FIG. 4 is a flow chart depicting session initiation functions that could be carried out in accordance with the exemplary embodiment of the invention.

Referring next to FIGS. 3 and 4, flow charts are provided to help illustrate some of the functions that can be carried out in accordance with the exemplary embodiment.

a. Maintenance of Group Data

In accordance with the exemplary embodiment, the client device 102 is capable of maintaining group data in data storage 204 of the device. As previously mentioned, the client device may maintain data that defines one or more group listings (each of which may be one or more group members) and corresponding group-ID and indicates, to the best of the client device's knowledge, the synchronization state for each group listing.

FIG. 3 illustrates a method of maintaining group data in accordance with the exemplary embodiment of the invention. The example of FIG. 3 shows steps performed by the client device 102. At step 302, the client device receives group data. The client device may receive group data in various ways. For example, a user may create a new group. Alternatively, a user may change the composition of a given one of the groups previously in the group data. Further, the client device may receive group data from communication with a communication server. After receiving group data, the client device may determine at step 304 whether a group-ID exists for the group data to correspond to the group list. If a group-ID does not exist, the client device may create at step 306 a group-ID for the specified group data. The client device may then update its group data at step 308 to indicate that the synchronization state is not up to date. The client device may maintain the data indicating that the synchronization state of the group as not up to date until the client device engages at step 310 in a synchronization process for that group with the communication server. After engaging in synchronization for that group with the server (possibly requiring receipt of an acknowledgement from the server if the client device assigns the group-ID), the client device may update at step 312 the record for that group to indicate the synchronization state is up to date.

If, on the other hand, a group-ID does exist, the client device may determine at step 314 whether the synchronization state for the group data is up to date. If the synchronization state for the group data is up to date, the client device may mark at step 312 the synchronization state for the group data as up to date. On the other hand, if the synchronization state for the group data is not up to date, the client device may mark at step 308 the synchronization state for the group data as not up to date. As previously mentioned, the client device may maintain the data indicating the synchronization state of the group data as not up to date until engaging in synchronization at step 310 for that group with the communication server. After engaging in synchronization, the client device may update at step 312 the synchronization state record for that group as up to date.

In practice, the user may locally establish or revise a group list. The user may establish or revise a group list with or without reference to the existing defined groups in data storage. In one arrangement, for instance, the client device may provide a user interface through which the user can designate a group, by selecting group members from a broader contact list on the device for example. The user may interact with this interface to designate a group at the time of session initiation or at some other time. When the user thereby designates a group, the client device may automatically search through its existing group definition(s) to determine whether the designated group is already defined and already has a corresponding assigned group-ID. If so, the client device need not create a new group definition, since the group definition exists already. On the other hand, if the client device does not find the designated group in its existing group definition(s), the client device may add the group to its group definitions and the client device may note in the record that the synchronization state of the group is not up to date, since the assumption is that the client device and server have not yet agreed to a group-ID for the newly defined group.

In another arrangement, the client device may provide a user interface through which the user can modify an existing group definition. Again, the user may interact with this interface at the time of session initiation or at another time. Through the interface, the client device may present the user with indications of the existing group definitions and the user may select a group. The user may then modify the group definition, by adding or removing members, again perhaps by reference to a broader contact list on the device. When this happens, the client device will note in the record that the synchronization state of the group is not up to date, again since the assumption is that the client device and server have not yet agreed to a group-ID for the newly defined group.

b. Synchronization of Group Data

In the exemplary embodiment, as mentioned above, the synchronization state for a group-ID is not identified as up to date until the client device and communication server have engaged in a synchronization process with respect to that group-ID. In general, a client device and communication server can synchronize or agree upon a correlation between a group-ID and a list of group members in various ways, whether the group-ID is assigned by the client device and reported to the server, or whether the group-ID is assigned by the server and reported to the client device.

In one arrangement, for instance, the client device can define the group-ID for a designated group listing and can report the group-ID and group listing to the server for later reference by the server. For example, a user may create or revise a group listing through an interface on the client device, such as by selecting members from a broader contact list. And in response, the client device may automatically assign a group-ID for the defined group and then store the group-ID in correlation with the group listing for later reference by the client device and send a synchronization-message to the server, providing the server with the group-ID and corresponding group listing for similar storage and later reference by the server. Further, this client-initiated synchronization process could happen concurrently with session initiation. In particular, the user may select group members for a session to be initiated, and the client device may then establish a corresponding group-ID and send the group members and group-ID in the session initiation request to the server.

In another arrangement, the server can define the group-ID for a designated group listing and can report the group-ID to the client device for later reference by the client device. For example, through an online interface for the server, the user may define the group listing (such as by entering or selecting members). And in response, the server may automatically assign a group-ID for the defined group and then store the group-ID in correlation with the group listing for later reference by the server and send a synchronization-message to the client device, providing the client device with the group-ID and corresponding group listing for similar storage and later reference by the client device.

As another example, the user may define the group on the client device, and the client device may responsively send a synchronization-message to the server, providing the server with the complete group listing. In response, the server may then automatically assign a group-ID for that group and store the group-ID in correlation with the group listing for later reference by the server. The server may further send a synchronization-message (e.g., a reply message) to the client device providing the client device with the group-ID, which the client device may similarly store in correlation with the group listing for later reference by the client device. Further, this process could happen concurrently with session initiation. In particular, the user may select group members for a session to be initiated, and the client device may provide the group listing to the server within a session initiation request. The server may then assign a corresponding group-ID and return the group-ID to the client device in a session initiation response message.

Other acceptable arrangements for a client device and communication server to synchronize a correlation between group-ID and group listing may be developed as well. Further, the timing of the synchronization may vary. For instance, synchronization can occur upon user request or automatically at times predetermined by the client device. Alternatively, synchronization could occur in response to particular triggering events, whether or not these triggering events are in response to a change in the composition of the group.

c. Session Initiation

A method of determining whether to initiate a group communication session by reference to a group-ID or by reference to a complete group listing is illustrated in FIG. 4. The complete group listing may be a listing naming one or more group members that make up the group. In addition to including the name of at least one group member, the complete group listing could further include reference to another group, such as a group-ID.

The example of FIG. 4 shows steps performed by the client device 102. At step 402, the client device may receive a request to initiate a group communication session with a given group. A user may select the group for session initiation in various ways. In one arrangement, the user may create the group listing at the time of session initiation. For example, the user may select group members from a broader contact list on the client device 102. Alternatively, the user may select the group for session initiation by selecting one of the groups already defined at the device, such as through a user interface that lists the existing groups. Even further, the user may select a group by combining a group already defined with different group members from a broader contact list.

As shown at step 404, after receiving a request for session initiation, the client device may determine whether the client device and communication server have agreed on a group-ID to correspond with the particular given group. In order to accomplish this step, the client device may determine whether the synchronization state for the designated group is up to date. If the synchronization state is up to date, at step 406 the client device may initiate the group communication session by reference to the group-ID. On the other hand, if the synchronization state is not up to date, at step 408 the client device may initiate the session by reference to the complete group listing.

In a scenario where the user creates the group listing at the time of session initiation, the client device may then responsively refer to its group data to determine whether the group listing designated by the user already exists in a group record on the client device. If the client device determines that the designated group listing already exists in the group record on the client device, then the client device may make the determination of the synchronization state of the existing group record by determining whether the group record indicates that the synchronization state of the group is up to date. If the group record indicates that the synchronization state of the group is up to date, then the client device may initiate the session by reference to the group-ID (step 406). On the other hand, if the group record indicates that the synchronization state of the group is not up to date, then the client device may initiate the session by reference to the complete group listing (step 408).

If the client device determines, however, that the designated group listing does not already exist in a group record on the device, then the client device may automatically create a group record for the newly designated group. The client device could further note in the group record that the synchronization state of the group is not up to date. In this case, after the request for initiation of a session at step 402, the client device would determine that the synchronization state is not up to date, and therefore would perform step 408.

As previously mentioned, in a request for session initiation, a user may select one of the groups already defined at the device, such as through a user interface that lists the existing group definitions. In that case, the client device may then make the determination of synchronization state by determining whether the group record indicates that the synchronization state of the group is up to date. If the group record indicates that the synchronization state of the group is up to date, then the client device may initiate the session by reference to the group-ID indicated in the group record (step 406). On the other hand, if the group record indicates that the synchronization state of the group is not up to date, then the client device may initiate the session by reference to the complete group listing (step 408).

6. Example Advantages

This process described above can be carried out largely transparently to the user of the client device. As previously mentioned, from the user's perspective, all that matters is that the user directs the client device to initiate a session with a specified group. If the synchronization state of the group is up to date, then the client device can most efficiently initiate the session by reference to the group-ID. This initiation decision performed by the client device avoids the need to send the complete group listing in the session initiation request, thereby conserving network resources. On the other hand, the client device could initiate the session by reference to the complete group listing in a scenario where synchronization of the group is not up to date, so as to provide the server with the proper group listing for the session.

Further, the invention advantageously avoids the need to synchronize group list data as soon as a change is made to the data. For instance, if a user makes a change to a particular group on the client device, it may be unnecessary for the device to immediately synchronize that change with the server, since session initiation with respect to that group could be transparently conducted by reference to the complete group listing in view of the lack of synchronization at the moment.

Although an exemplary embodiment of the present invention has been described in a PTT system, it would be understood by one skilled in the art that this could be extended to any scenario where a server may need an understanding of group members in order to receive a message from some party and send the message to a specified group. For example, the system may be an instant messaging (IM) system, where there might be an IM server. The system may be a short message service (SMS) system or a multimedia message service (MMS) system, where there might be a group messaging server. Alternatively, the system may be an email system, where there might be email group messaging server. While these are examples of group messaging systems, other group messaging systems are possible as well.

7. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. A communication device comprising:
    a network communication interface operable to send and receive session initiation signaling and operable to send and receive bearer traffic;
    a user interface operable to interact with a user of the device;
    session-initiation logic operable, in response to a request from the user to initiate a network-based communication session with a group of one or more parties designated by the user, (i) to make a determination whether a client-server synchronization state for the designated group is up to date, (ii) to initiate the requested session by reference to a group-ID corresponding with the designated group, if the determination is that the client-server synchronization state for the designated group is up to date, and (iii) to initiate the requested session by reference to a complete group listing for group, if the determination is that the client-server synchronization state for the designated group is not up to date.

2. The communication device of claim 1, wherein the communication device is a cell phone.

3. The communication device of claim 2, wherein the network-based communication session is a push-to-X session, and wherein the communication device further comprises a push-to-X invocation button engagable by the user to provide the request.

4. The communication device of claim 1, wherein, in a scenario where the session-initiation logic operates to initiate the requested session by reference to the group-ID, the session-initiation logic sends to a communication server a session initiation request specifying the group-ID and not specifying the complete group listing for the group.

5. The communication device of claim 1, wherein, in a scenario where the session-initiation logic operates to initiate the requested session by reference to the complete group listing for the group, the session-initiation logic sends to a communication server a session initiation request specifying the complete group listing.

6. The communication device of claim 5, wherein the complete group listing comprises a listing of at least one group member and at least one group-ID.

7. The communication device of claim 1, further comprising:
group data defining one or more groups, including, respectively for each group (i) a group listing and (ii) an indication of whether the client-server synchronization state of the group is up to date.

8. The communication device of claim 7, further comprising:
synchronization-logic operable, in response to a change in a given group listing of a given group, to set the client-server synchronization state for the given group to be not up to date.

9. The communication device of claim 8, wherein the synchronization-logic is further operable, in response to the communication device engaging in a synchronization process for the given group with a communication server, to set the client-server synchronization state for the given group to be up to date.

10. The communication device of claim 9,
wherein the synchronization process involves the communication device sending to the communication server a group-ID for the given group and a group listing for the given group, and
wherein the synchronization-logic is operable to set the client-server synchronization state for the group to be up to date upon receipt of a synchronization acknowledgement from the communication server.

11. The communication device of claim 9,
wherein the synchronization process involves the communication server sending to the communication device a group-ID for the given group and a group listing for the given group, and
wherein the synchronization-logic is operable, in response to receipt of the group-ID for the given group and the group listing for the given group, (i) to determine whether the received group listing for the given group is already defined as an existing group by the group data, (ii) if the received group listing for the given group is already defined as an existing group by the group data, to update the group data to specify for the existing group the received group-ID, and (iii) if the received group listing for the given group is not already defined as an existing group by the group data, to update the group data to specify the given group, including both the received group listing and the received group-ID.

12. The communication device of claim 9,
wherein the synchronization process involves the communication server sending to the communication device a group-ID for the given group and a group listing for the given group, and
wherein the synchronization-logic is further operable, in response to receipt of the group-ID for the given group and the group listing for the given group, (a) to determine whether the received group-ID for the given group is already defined as an existing group-ID by the group data, (b) if the received group-ID for the given group is already defined as an existing group-ID by the group data, to update the group data to correlate the received group listing with the existing group-ID, and (c) if the received group-ID for the given group is not already defined as an existing group by the group data, to update the group data to specify the given group, including both the received group listing and the received group-ID.

13. The communication device of claim 7, further comprising:
group-designation logic operable to receive a user designation of a group listing and to responsively (i) search through the group data to determine whether the designated group listing is already defined by the group data, and, (ii) if the designated group listing is not already defined by the group data, then add the group listing to the group data and set the client-server synchronization state for the group listing to not up to date.

14. The communication device of claim 7, further comprising:
group-modification logic operable to receive a user instruction to modify a group listing defined by the group data and to responsively (i) modify the group listing defined by the group data and (ii) set the client-server synchronization state for the group listing to be not up to date.

15. The communication device of claim 1, wherein the session-initiation logic is operable to make the determination transparently to the user.

16. The communication device of claim 1, wherein the session-initiation logic is operable to receive from the user, via the user-interface, the request to initiate the session in conjunction with a designation of the group.

17. The communication device of claim 16, wherein the session-initiation logic is operable to receive from the user the designation of the group by receiving from the user a selection of the one or more parties from a contact list stored in the communication device.

18. The communication device of claim 16, wherein the session-initiation logic is operable (i) to determine whether the designated group already exists in a group record on the communication device, (ii) if the designated group does not already exist in a group record on the communication device, to create a group record for the designated group and to make the determination that the client-server synchronization state for the designated group is not up to date, and (iii) if the designated group already exists in a group record on the communication device, to make the determination based on a synchronization state indicated by group record.

19. A method comprising:
receiving into a client device, from a user of the client device, a request to initiate a network-based communication session between the client device and a group of one or more parties designated by the user;
responsively making a determination at the client device whether a client-server synchronization state for the designated group is up to date;
if the determination is that the client-server synchronization state is up to date, then the client device initiating the requested session by reference to a group-ID corresponding with the group; and
if the determination is that the client-server synchronization state is not up to date, then the client device initiating the requested session by reference to a complete group listing for the group.

20. The method of claim 19, further comprising:
maintaining group data in data storage of the client device, the group data defining one or more groups and indicating for each of the defined groups whether or not client-server synchronization state of the defined group is up to date, wherein making the determination of whether the client-server synchronization state for the designated group is up to date comprises referring to the group data to make the determination.

21. The method of claim 20, further comprising:

in response to a change in composition of a given one of the one or more groups, setting set the client-server synchronization state for the given group to be not up to date.

22. The method device of claim 19, further comprising:

engaging in a synchronization process for the group with a communication server; and responsively setting the client-server synchronization state for the group to be up to date.

23. A method comprising:

receiving into a client device, from a user of the client device, a request to establish a communication with one or more parties designated by the user;

responsively making a determination at the client device whether a client-server synchronization state for the designated group is up to date;

if the determination is that the client-server synchronization state is up to date, then the client device initiating the communication by reference to a group-ID corresponding with the group; and if the determination is that the client-server synchronization state is not up to date, then the client device initiating the communication by reference to a complete group listing for the group.

24. The method of claim 23, wherein the communication is selected from the group consisting of an instant message communication, a SMS message communication, a MMS message communication, and an e-mail message communication.

* * * * *